United States Patent
Tang et al.

(10) Patent No.: US 8,331,113 B2
(45) Date of Patent: Dec. 11, 2012

(54) RESONANT SWITCHING CIRCUIT FOR HARMONIC SUPPRESSION OF INPUT CURRENT UTILIZING FREQUENCY MODULATION

(75) Inventors: Pak-Chuen Tang, Hong Kong (CN); Kwong-Ming Ching, Hong Kong (CN); Chung-Hei Poon, Hong Kong (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 187 days.

(21) Appl. No.: 13/017,902

(22) Filed: Jan. 31, 2011

(65) Prior Publication Data
US 2012/0020119 A1  Jan. 26, 2012

(30) Foreign Application Priority Data
Jul. 20, 2010  (CN) .......................... 2010 1 0234958

(51) Int. Cl.
*H02M 3/335* (2006.01)
*G05F 5/00* (2006.01)
(52) U.S. Cl. .............. 363/24; 363/25; 363/26; 323/266; 323/299
(58) Field of Classification Search .................. 363/24, 363/25, 26; 323/266, 299
See application file for complete search history.

(56) References Cited

U.S. PATENT DOCUMENTS

| | | | | |
|---|---|---|---|---|
| 4,367,521 A | * | 1/1983 | Kohata et al. | ................. 363/136 |
| 5,367,248 A | * | 11/1994 | Lin | ................................ 323/312 |
| 2005/0162098 A1 | * | 7/2005 | Ball | ................................ 315/291 |
| 2009/0086512 A1 | * | 4/2009 | Fahlenkamp et al. | ...... 363/21.06 |
| 2011/0050188 A1 | * | 3/2011 | Wang et al. | .................... 323/282 |

* cited by examiner

*Primary Examiner* — Bao Q Vu
(74) *Attorney, Agent, or Firm* — Kirton McConkie; Evan R. Witt

(57) ABSTRACT

The invention discloses a control circuit for an AC-DC converter. The control circuit includes a power control circuit for comparing an input current sensing signal generated by sensing an input current of the AC-DC converter and a power level control input and in response thereto generating a frequency modulation control signal, in which the frequency modulation control signal is used to control the output power of the AC-DC converter and suppress harmonics of the input current, and a square wave generator connected to the power control circuit for generating a driving signal used to drive the switch circuit of the AC-DC converter according to the frequency modulation control signal, in which the frequency of the driving signal is varied with the frequency modulation control signal, thereby suppressing harmonics of the input current and regulating the switching frequency the AC-DC converter, and regulating the output power of the AC-DC converter.

10 Claims, 5 Drawing Sheets

FIG. 5A  VDC  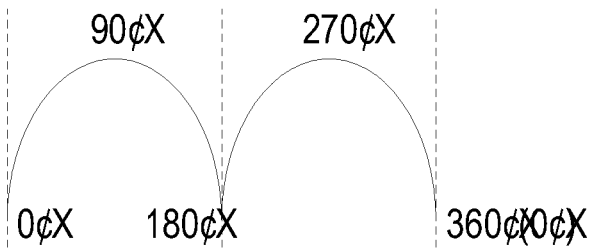
FIG. 5B  Input Current Without Harmonic Suppression Control  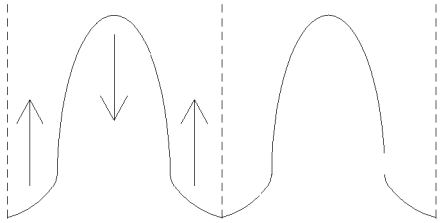
FIG. 5C  Input Current With Harmonic Suppression Control  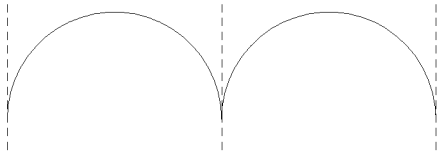
FIG. 5D  Driving Signal For High-Side Switch 2081  
FIG. 5E  Driving Signal For Low-Side Switch 2082  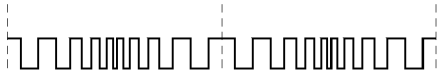
FIG. 5F  Input Current Sensing Signal Va  
FIG. 5G  Power Level Control Input  
FIG. 5H  Frequency Modulation Control Signal 306  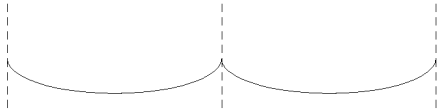

RESONANT SWITCHING CIRCUIT FOR HARMONIC SUPPRESSION OF INPUT CURRENT UTILIZING FREQUENCY MODULATION

FIELD OF THE INVENTION

The invention relates to a control circuit for AC-DC converter, and more particularly to a control circuit for AC-DC converter without the need of an input voltage detection circuit and without incorporating a frequency modulation control circuit dedicated for the purpose of suppressing the harmonics of the input current.

BACKGROUND OF THE INVENTION

AC-DC converter is generally known for converting an input AC voltage into an output DC voltage in order to drive a load, such as a magnetron used in a microwave or a gas discharge lamp that requires DC power to operate. FIG. 1 is a circuit block diagram showing an AC-DC converter according to the prior art. As shown in FIG. 1, an input AC voltage Vin is supplied to the input side of the AC-DC converter. A bridge rectifier 104 is connected to the input side of the AC-DC converter for rectifying the input AC voltage Vin into a full-wave rectified DC voltage. A filtering choke 106 and a filtering capacitor 112 are connected to the bridge rectifier 104 for suppressing the electromagnetic interference of the input AC voltage Vin. Besides, the AC-DC converter of FIG. 1 further includes a transformer T100 and a switch circuit 108, in which the switch circuit 108 is connected to the primary winding of the transformer T100 and consists of a high-side switch 1081 and a low-side switch 1082. The switch circuit 108 is used to control the energy transfer between the primary side and the secondary side of the transformer T100. The AC-DC converter of FIG. 1 further includes a snubber capacitor Cb1 and a resonant capacitor Cb2, in which the resonant capacitor Cb2 and the magnetizing inductance of the primary side of the transformer T100 constitute a resonant circuit. The high-side switch 1081 and the low-side switch 1082 are configured to switch in an alternate manner. That is, the high-side switch 1081 and the low-side switch 1082 are turned on and off alternately. By the alternate switching operation of the high-side switch 1081 and the low-side switch 1082, the energy stored in the primary side of the transformer T100 is transferred to the secondary side of the transformer T100 according to the switching operation of the switch circuit 108, thereby inducing an AC voltage across the secondary side of the transformer T100. The amount of the energy transferred across the transformer T100 is determined by the duty ratio of the high-side switch 1081 to the low-side switch 1082. In other words, the switching control method employed in a conventional AC-DC converter is achieved by regulating the duty cycle of the high-side switch 1081 and the duty cycle of the low-side switch 1082. Besides, the AC-DC converter of FIG. 1 further includes a secondary circuit 110 consisted of an output rectification circuit (D102, D104) and output capacitors C102 and C104. The output rectification circuit (D102, D104) is used to rectify the AC voltage induced across the secondary side of the transformer T100 into a DC voltage, and the output capacitors C102 and C104 are used to output the DC voltage to a load 120.

Also, the AC-DC converter of FIG. 1 further includes an input current sensor 130 which may be implemented by a current-sensing resistor or a current transformer. The input current sensor 130 is used to sense the input current Iin and generate an input current sensing signal V1 accordingly. The AC-DC converter of FIG. 1 further includes an input voltage sensor 140 for sensing the sinusoidal waveform of the input AC voltage Vin and outputting an input AC voltage sensing waveform signal V2 to the frequency modulation control circuit 1061. The waveform of the input AC voltage waveform sensing signal V2 is analogous to waveform of the input AC voltage Vin after being half-wave rectified or after being full-wave rectified. The AC-DC converter of FIG. 1 further includes a power control circuit 150 for comparing the input current sensing signal V1 outputted from the input current sensor 130 and an external input power control signal and outputting a control signal used to regulate the output power of the AC-DC converter. The control signal outputted from the power control circuit 150 is simply a DC signal without including the half-sinusoidal sampling signal or full-sinusoidal sampling signal of the input AC voltage Vin (the input AC voltage sensing waveform signal V2). Hence, the control signal outputted from the power control circuit 150 is used to provide information about the output power of the AC-DC converter only without the function of regulating or suppressing the harmonics of the input current Iin. The AC-DC converter of FIG. 1 further includes a switching control circuit 160 consisted of a frequency modulation control circuit 1061, an oscillator 1062, a dead-time control circuit 1063, and a switch device driver 1064. The frequency modulation control circuit 1061 is used to receive the input AC voltage waveform sensing signal V2 which is analogous to waveform of the input AC voltage Vin after being half-wave rectified or after being full-wave rectified and the control signal outputted from the power control circuit 150 for suppressing the harmonics of the input current Iin and improving the power factor of the input AC voltage Vin. The oscillator 1062 is used to generate a timing pulse signal with a sawtooth waveform according to the output of the frequency modulation control circuit 1061. The switch device driver 1064 is used to generate a square wave signal for regulating the switching frequency or the duty cycle of the switch circuit 108 according to the sawtooth-waveform timing pulse signal outputted from the oscillator 1062. The dead-time control circuit 1063 is used to control the dead time of the switch circuit 108 in order to prevent the switches 1081 and 1082 from being simultaneously turned on or off, thereby regulating the duty cycle of the ON period and the OFF period of the switch circuit 108.

Nonetheless, the conventional AC-DC converter requires an input voltage sensor to sense the variation of the input AC voltage and a dedicated frequency modulation control circuit to suppress the harmonics of the input current Iin. Also, the circuitry for suppressing the harmonics of the input current Iin and the power control circuit are separate from each other. If it is possible to simplify the circuit design of these circuitries or implemented these circuitries with low-cost elements, the cost of the AC-DC converter can be reduced and the design complexity of the AC-DC converter can be degraded. The invention is addressed to meet these needs.

SUMMARY OF THE INVENTION

An object of the invention is to provide a control circuit for AC-DC converter for suppressing the harmonics of the input current without the need of an input voltage detector (input voltage sensor) and without the need of a frequency modulation control circuit dedicated for harmonic control. Also, the inventive control circuit can regulate the output power of the AC-DC converter according to user's demands.

Another object of the invention is to provide an AC-DC converter including a control circuit for suppressing the harmonics of the input current without the need of an input voltage detector (input voltage sensor) and without the need of a frequency modulation control circuit dedicated for harmonic control. Also, the inventive AC-DC converter allows the user to regulate the output power of the AC-DC converter according to user's demands.

The inventive control circuit for AC-DC converter mainly includes a power control circuit for comparing an input current sensing signal generated by sensing an input current of the AC-DC converter and a power level control input for outputting a frequency modulation control signal, in which the frequency modulation control signal is used for both the output power control for the AC-DC converter and the harmonic control for the AC-DC converter. The inventive control circuit for AC-DC converter further includes a square wave generator connected to the power control circuit for generating a driving signal for driving the switch circuit of the AC-DC converter according to the frequency modulation control signal with the frequency of the driving signal being varied with the frequency modulation control signal, thereby suppressing the harmonics of the input current of the AC-DC converter and regulating the switching frequency of the switch circuit and regulating the output power of the AC-DC converter.

The inventive AC-DC converter includes a rectifier connected to an input side of the AC-DC converter for rectifying an input AC voltage into a rectified DC voltage, a filter circuit connected to an output end of the rectifier for suppressing an electromagnetic interference and high-frequency noises of the input AC voltage to generate a DC voltage being analogous to the waveform of input AC voltage after being half-wave or full-wave rectified, a transformer having a primary side connected to the filter circuit and a secondary side, a switch circuit connected to the primary side of the transformer and the filter circuit for controlling the energy transfer between the primary side and the secondary side of the transformer, a current sensor connected to the rectifier for detecting an input current and generating an input current sensing signal accordingly, and a control circuit connected to a control terminal of the switch circuit for generating a driving signal for driving the switch circuit according to the input current sensing signal and a power level control input, thereby suppressing the harmonics of the input current and regulating the output power of the AC-DC converter. Besides, the frequency of the driving signal is varied with the input current sensing signal and the power level control input.

Now the foregoing and other features and advantages of the present invention will be best understood through the following descriptions with reference to the accompanying drawings, wherein:

BRIEF DESCRIPTION OF THE DRAWINGS

FIG. 5 illustrates waveform diagrams showing the voltage waveforms and current waveforms measured at the circuit nodes of the AC-DC converter according to the invention.

DESCRIPTION OF THE PREFERRED EMBODIMENT

Several exemplary embodiments embodying the features and advantages of the invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as a confinement for the invention.

Figure 1:
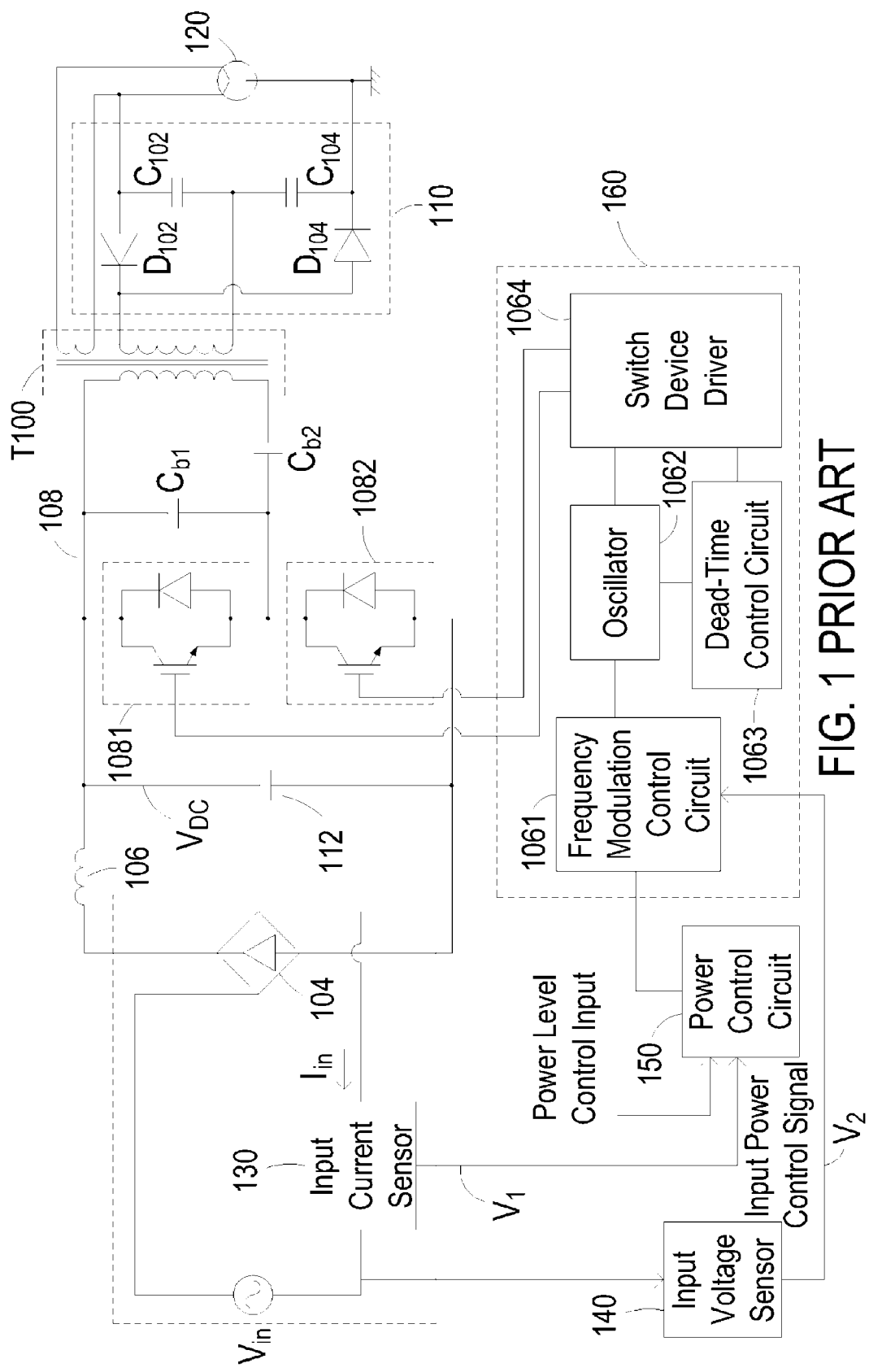
FIG. 1 is a circuit block diagram showing an AC-DC converter according to the prior art.
Figure 2:
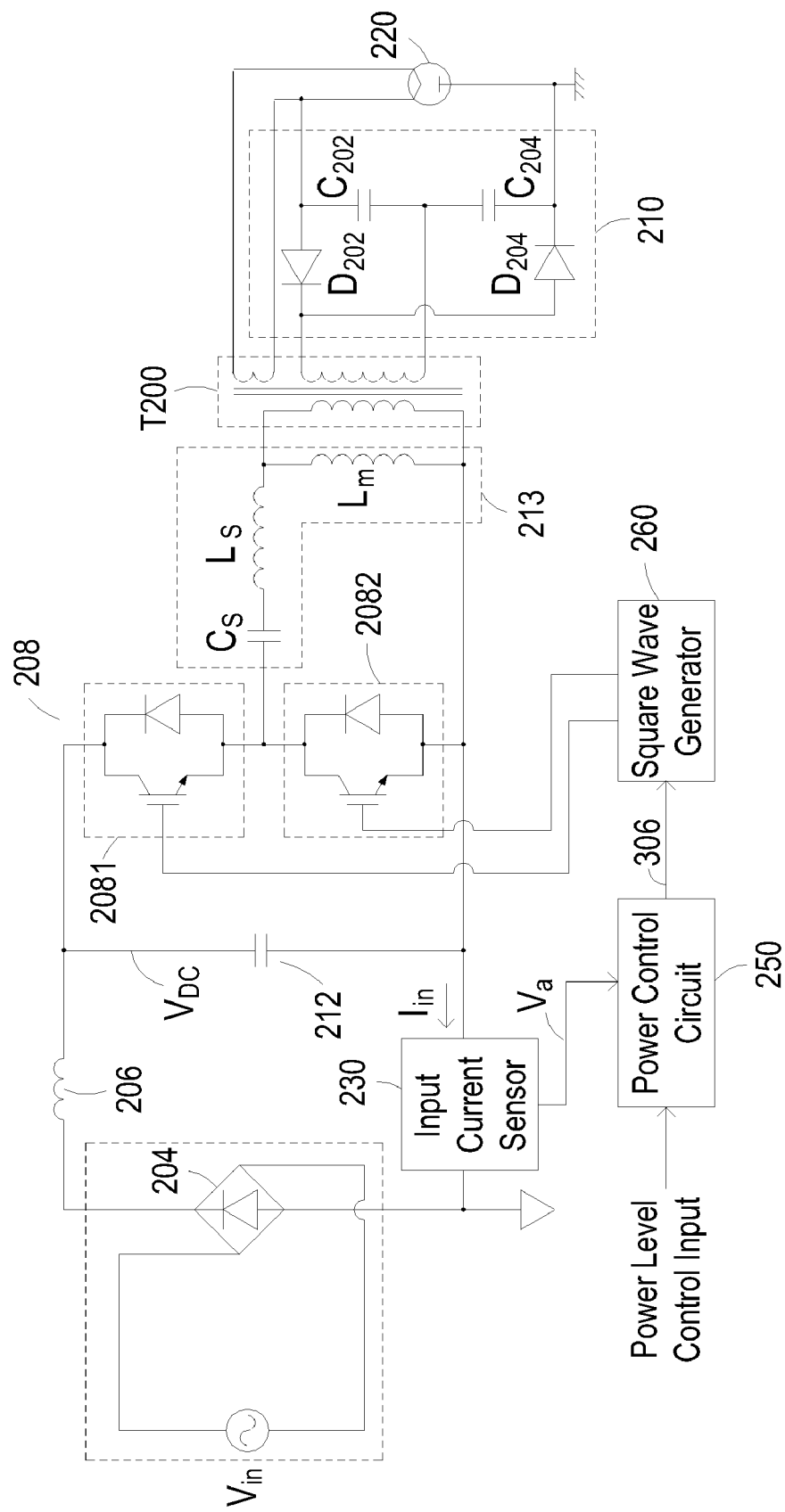
FIG. 2 is a circuit block diagram showing an AC-DC converter according to one embodiment of the invention.

FIG. 2 is a circuit block diagram showing an AC-DC converter according to one embodiment of the invention. In FIG. 2, the input current sensor 230, the bridge rectifier 204, the filter circuit consisted of a filtering choke 206 and a filtering capacitor 212, the switch circuit 208 consisted of a high-side switch 2081 and a low-side switch 2082, the transformer T200, the secondary circuit 210 consisted of an output rectification circuit (D202, D204) and output capacitors C202 and C204, and the load 220 are operating in a similar manner with the counterpart elements deployed in the conventional AC-DC converter of FIG. 1, and it is not intended to give details about the operation of these circuit elements herein. The filtering choke 206 and the filtering capacitor 212 constitute a filter circuit connected to a positive output terminal of the bridge rectifier 204 and the switch circuit 208 for suppressing the electromagnetic interference and high-frequency noises and generating a DC voltage $V_{DC}$ being analogous to the waveform of input AC voltage after being half-wave or after being full-wave rectified. For example, the DC voltage $V_{DC}$ is generated by suppressing the high-frequency noises of the input AC voltage Vin with the frequency of the high-frequency noises being above 60 Hz. The AC-DC converter of FIG. 2 further includes a LLC series resonant circuit 213 (or an inductor-inductor-capacitor series resonant circuit) consisted of a first resonant capacitor Cs, a first resonant inductor Ls, and a second resonant inductor Lm. However, the resonant circuit 213 may be a LLC parallel resonant circuit as well. In the instant embodiment, one end of the first resonant capacitor Cs is connected to a junction node between the high-side switch 2081 and the low-side switch 2082, and the other end of the first resonant capacitor Cs is connected to one end of the first resonant inductor Ls. One end of the first resonant inductor Ls is connected to the first resonant capacitor Cs, and the other end of the first resonant inductor Ls is connected to the primary side of the transformer T200. The first resonant inductor Ls may be the leakage inductance of the transformer T200 and the second resonant inductor Lm may be the magnetizing inductance of the transformer T200. The first resonant capacitor Cs may be used as a DC blocking capacitor for preventing the DC component of the input AC voltage Vin from being inputted into the transformer T200. The LLC series resonant circuit 213 is used to transfer the energy of the input AC voltage Vin to the primary side of the transformer T200 by way of resonance according to the switching operation of the switch circuit 208. In operation, the high-side switch 2081 and the low-side switch 2082 are switching in an alternate manner. That is, the high-side switch 2081 and the low-side switch 2082 are turned on and off alternately. In this manner, the LLC series resonant circuit 213 can be coupled to the filtering choke 206 or the input current sensor 230 by the high-side switch 2081 or the low-side switch 2082, respectively. As to the operation of the LLC series resonant circuit 213, the details have been given in U.S. Pat. No. 6,344,979, and it is not intended to dwell upon this issue herein. The AC-DC converter of FIG. 2 further includes a power control circuit 250 and a square wave generator 260. The power control circuit 250 and the square wave generator 260 constitute a control circuit, in which the power control circuit 250 is used to receive an input current sensing signal Va generated by sensing the input current Iin by the input current sensor 230 and an external power level control input for generating a frequency modulation control signal 306. The square wave generator 260 is connected between the power control circuit 250 and the control terminal of the switch circuit 208 for generating a driving signal for driving the switch circuit 208, in which the frequency of the driving signal is varied with the frequency modulation control signal 306. As the frequency modulation control signal 306 is varied with the input current sensing signal Va and the external power level control input, the frequency of the driving signal will vary with the input current sensing signal Va and the external power level control input. As the frequency modulation control signal 306 carries the information about the power control and the information about the waveform of the sampling signal of the input current Iin that is analogous to the input AC voltage Vin after being half-wave or after being full-wave rectified, the frequency modulation control signal 306 can both control the output power of the AC-DC converter and suppress the harmonics of the input current Iin. Hence, a single power control circuit 250 is sufficient to replace the power control circuit 150 and the frequency modulation control circuit 1061 of the conventional AC-DC converter shown in FIG. 1. As to the circuit architecture and operation principle of the power control circuit 250, it will be described in detail in the following paragraphs.

Figure 3:
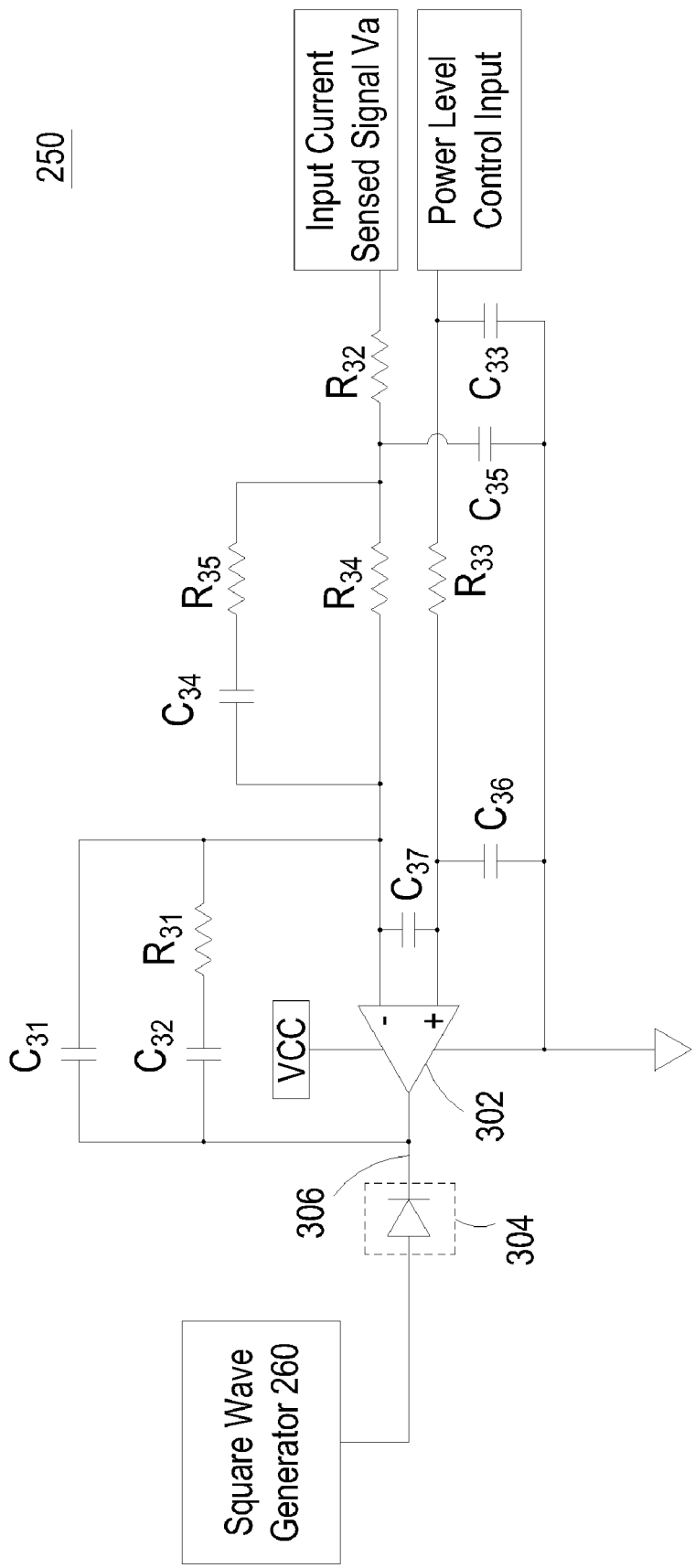
FIG. 3 is circuit diagram showing the circuitry of the power control circuit of FIG. 2.

FIG. 3 shows the circuitry of the power control circuit 250. As shown in FIG. 3, the power control circuit 250 includes a proportional subtractor circuit and a reverse current isolation device 304. The proportional subtractor circuit includes a power amplifier (or an operational amplifier) 302, a plurality of resistors R31-R34, and a plurality of capacitors C31-C37. It should be noted that the proportional subtractor circuit is configured in a negative feedback topology. The power amplifier 302 has a negative input terminal for receiving the input current sensing signal Va outputted from the input current sensor 230 and a positive input terminal for receiving the external power level control input. The external power level control input represents the magnitude of the output power desired by the user. For example, if the external power level control input is a 5V voltage, it indicates that the output power desired by the user is 100 W. The power amplifier 302 is configured to compare the input current sensing signal Va outputted from the input current sensor 230 and the external power level control input inputted by the user, and output the frequency modulation control signal 306 in response to the comparison. In other words, the frequency modulation control signal 306 is the proportional difference between the power level control input and the input current sensing signal Va. The reverse current isolation device 304 is an optional element and may be implemented by a diode. The reverse current isolation device 304 is connected between the power amplifier 302 and the square wave generator 260 for preventing a reverse current from flowing from the square wave generator 260 to the power amplifier 302. The frequency modulation control signal 306 is transmitted to the square wave generator 260 in order to allow the square wave generator 260 to regulate the switching frequency of the driving signal used to drive the switch circuit according to the frequency modulation control signal 306, and suppress the harmonics of the input current Iin accordingly.

Figure 4:
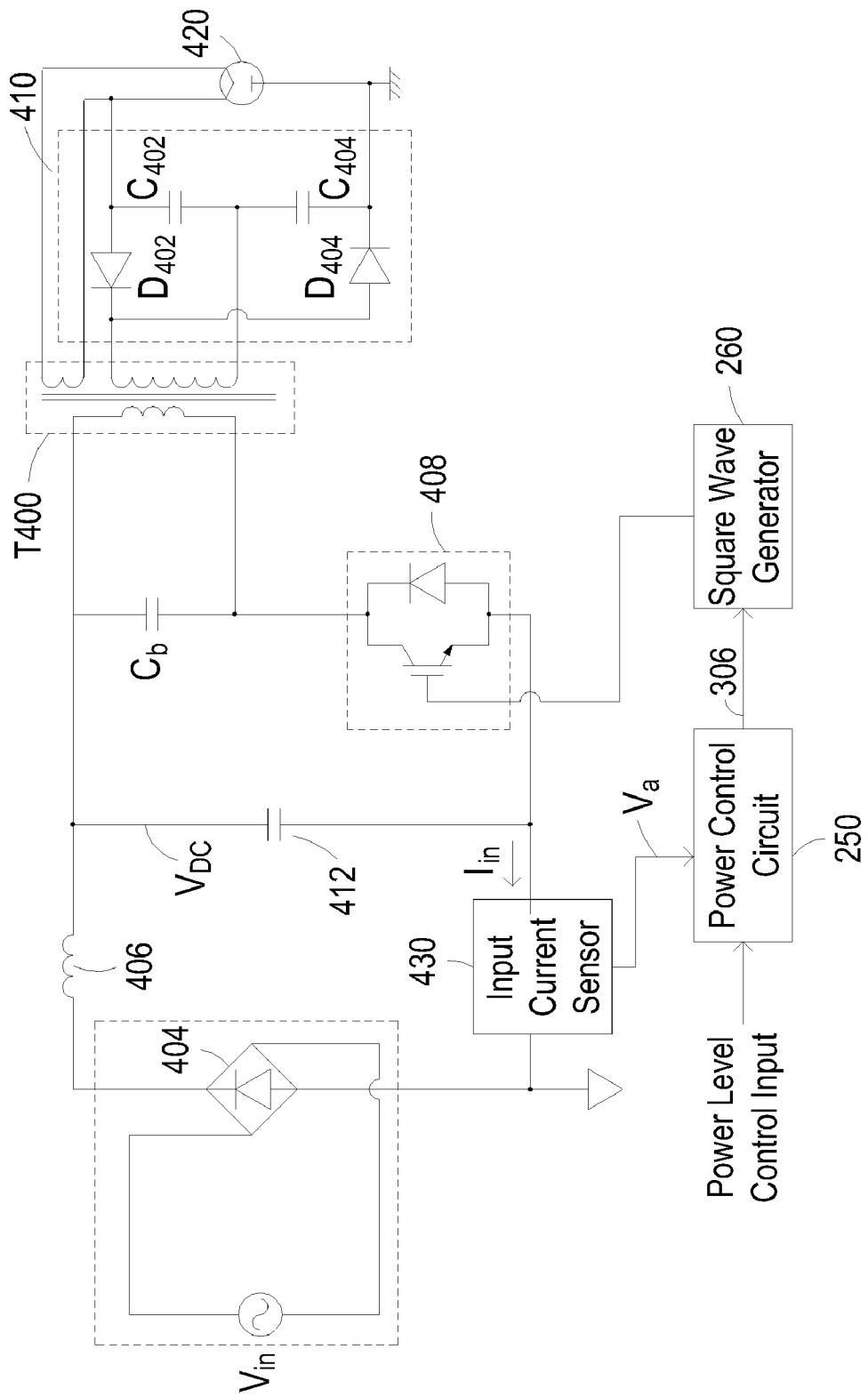
FIG. 4 is a circuit block diagram showing an AC-DC converter according to another embodiment of the invention.

FIG. 4 shows the AC-DC converter according to another embodiment of the invention. In FIG. 4, the input current sensor 430, the bridge rectifier 404, the filtering choke 406, the filtering capacitor 412, the transformer T400, the secondary circuit 410 consisted of the output rectification circuit (D402, D404) and the output capacitors C402 and C404, and the load 420 have similar functionality and configuration with the counterpart elements in the AC-DC converter of FIG. 2, and it is not intended to give details about the operation of the aforementioned elements herein. Compared to the embodiment of FIG. 2, the embodiment of FIG. 4 does not employ a LLC resonant circuit to transfer the energy of the input AC voltage Vin to the primary side of the transformer T400. Instead, the embodiment of FIG. 4 employs a quasi-resonance circuit consisted of a second resonant capacitor Cb and the magnetizing inductance of the transformer T400 to replace the LLC resonant circuit of FIG. 2. Furthermore, the high-side switch 2081 and the low-side switch 2082 are simplified to a single switch 408, as shown in FIG. 4. By the switching operation of the switch circuit 408, the quasi-resonance circuit consisted of the second resonant capacitor Cb and the magnetizing inductance will accommodate a resonant frequency with resonance effect to allow the energy of the input AC voltage Vin to be transferred to the primary side of the transformer T400, thereby allowing the energy of the input AC voltage Vin to be transferred from the primary side of the transformer T400 to the secondary side of the transformer T400. Furthermore, the AC-DC converter of FIG. 4 employs a single switch 408 instead of a high-side switch and a low-side switch to control the energy transfer between the primary side and the secondary side of the transformer T400, thereby reducing the power loss and switching loss of the switch circuit.

FIGS. 5A-5H show the voltage waveforms and current waveforms measured at the circuit nodes of the AC-DC converter according to the invention. FIG. 5A is the voltage waveform of the DC voltage $V_{DC}$ which is generated by performing full-wave rectification to the input AC voltage Vin by the bridge rectifier (204, 404) and performing filtration to the full-wave rectified DC voltage outputted from the bridge rectifier (204, 404) by the filtering capacitor (212, 412). The frequency of the DC voltage $V_{DC}$ is equal to or twice of the frequency (e.g. 60 Hz or 120 Hz) of the input AC voltage Vin. FIG. 5B shows the current waveform of the uncorrected input current Iin as the power control circuit 250 and the square wave generator 260 is not applied to the AC-DC converter, and FIG. 5C shows the current waveform of the corrected input current Iin as the power control circuit 250 and the square wave generator 260 is applied to the AC-DC converter. It can be readily known from FIGS. 5B and 5C that as the power control circuit 250 and the square wave generator 260 is applied to the AC-DC converter, the current waveform of the input current of FIG. 5B will be smoothed and resembles the voltage waveform of the DC voltage $V_{DC}$ of FIG. 5A or the voltage waveform of the input AC voltage being full-wave rectified. As shown in FIG. 5C, the waveform of the corrected input current is analogous to the waveform of a sinusoidal wave after being full-wave rectified, and the high-frequency noises of the input current is suppressed. FIG. 5F shows the current waveform of the input current sensing signal Va which is derived by sampling or attenuating the corrected input current Iin of FIG. 5C. FIG. 5G shows the waveform of the power level control input inputted by the user which indicates the magnitude of the output power desired by the user. FIG. 5H shows the waveform of the frequency modulation control signal 306 outputted from the power amplifier 302. FIG. 5D is the waveform of the driving signal of the high-side switch 2081 and FIG. 5E is the waveform of the driving signal of the low-side switch 2082. It can be understood from FIGS. 5D and 5E that the high-side switch 2081 and the low-side switch 2082 are turned on and off alternately. Also, the duty ratio of the driving signals of the switch circuit 208 is fixed at a constant value, for example, 50%. However, the switching frequency of the high-side switch 2081 and the low-side switch 2082 is regulated according to the frequency modulation control signal 306. When the DC voltage $V_{DC}$ or the full-wave rectified DC voltage of the input AC voltage Vin is increased, the switching frequency of the high-side switch 2081 and the low-side switch 2082 is increased. When the DC voltage $V_{DC}$ or the full-wave rectified DC voltage of the input AC voltage Vin is decreased, the switching frequency of the high-side switch 2081 and the low-side switch 2082 is decreased. Hence, the AC-DC converter of the invention is capable of achieving the purpose of output power regulation by regulating the switching frequency of the high-side switch 2081 and the low-side switch 2082 according to the power level desired by the user. More advantageously, the harmonics of the input current Iin can be regulated or suppressed.

In conclusion, the invention provides a control circuit for AC-DC converter which includes a power control circuit and a square wave generator. The power control circuit can be implemented by a proportional subtractor including a power amplifier and configured in a negative feedback topology. The power amplifier is used to compare the input current sensing signal Va and a power level control input inputted by the user and generate a frequency modulation control signal accordingly, thereby allowing the square wave generator to generate a driving signal for driving the switch circuit of the AC-DC converter. The frequency of the driving signal is varied with the frequency modulation control signal in order to regulate the output power of the AC-DC converter. Therefore, the AC-DC converter of the invention does not need an input voltage sensor to generate a reference voltage for the purpose of output power control, and does not need a dedicated frequency modulation control circuit to suppress the harmonics of the input current. The AC-DC converter of the invention only needs a power control circuit consisted of a power amplifier and a square wave generator for suppressing the harmonics of the input current and regulating the output power of the AC-DC converter according to user's demands.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A controller for controlling a switch circuit of an AC-DC converter, comprising:
    a power control circuit for comparing an input current sensing signal generated by sensing an input current of the AC-DC converter and a power level control input and in response thereto generating a frequency modulation control signal, wherein the frequency modulation control signal is used to control an output power of the AC-DC converter and suppress harmonics of the input current of the AC-DC converter; and
    a square wave generator connected to the power control circuit for generating a driving signal used to drive the switch circuit of the AC-DC converter according to the frequency modulation control signal, wherein a frequency of the driving signal is varied with the frequency modulation control signal, thereby suppressing the harmonics of the input current of the AC-DC converter and regulating a switching frequency of the switch circuit, and regulating the output power of the AC-DC converter.

2. The controller according to claim 1 wherein the power control circuit includes a proportional subtractor circuit.

3. The controller according to claim 2 wherein the power control circuit further includes a reverse current isolation device connected between the proportional subtractor circuit and the square wave generator for preventing a reverse current from flowing from the square wave generator to the proportional subtractor circuit.

4. The controller according to claim 3 wherein the reverse current isolation device includes a diode.

5. An AC-DC converter, comprising:
    a rectifier connected to an input side of the AC-DC converter for rectifying an input AC voltage into a rectified DC voltage;
    a filter circuit connected to an output end of the rectifier for suppressing electromagnetic interference and high-frequency noises of the input AC voltage, thereby generating a DC voltage with a waveform being analogous to the input AC voltage after being half-wave rectified or after being full-wave rectified;
    a transformer having a primary side connected to the filter circuit and a secondary side;
    a switch circuit connected to the primary side of the transformer and the filter circuit for controlling an energy transfer between the primary side and the secondary side of the transformer;
    a current sensor connected to the rectifier for sensing an input current of the AC-DC converter and generating an input current sensing signal accordingly; and
    a control circuit connected to a control terminal of the switch circuit for generating a driving signal used to drive the switch circuit according to the input current sensing signal and a power level control input, thereby suppressing harmonics of the input current of the AC-DC converter and regulating an output power of the AC-DC converter;
    wherein a frequency of the driving signal is varied with the input current sensing signal and the power level control input.

6. The AC-DC converter according to claim 5 further comprising a resonant circuit connected between the switch circuit and the primary side of the transformer for transferring energy of the input AC voltage to the primary side of the transformer by resonance.

7. The AC-DC converter according to claim 6 wherein the resonant circuit includes a resonant capacitor, a first resonant inductor, and a second resonant inductor, and wherein the first resonant inductor is a leakage inductance of the transformer and the second resonant inductor is a magnetizing inductance of the transformer.

8. The AC-DC converter according to claim 5 further comprising a quasi-resonance circuit connected to the switch circuit and the primary side of the transformer for accommodating a resonant frequency with resonance effect according to the switching operation of the switch circuit, thereby allowing the energy of the input AC voltage to be transferred to the primary side of the transformer and further allowing the energy of the input AC voltage to be transferred from the primary side of the transformer to the secondary side of the transformer.

9. The AC-DC converter according to claim 5 wherein the control circuit includes:
    a power control circuit for comparing the input current sensing signal generated and the power level control input and in response thereto generating a frequency modulation control signal, wherein the frequency modulation control signal is used to control the output power of the AC-DC converter and suppress the harmonics of the input current of the AC-DC converter; and a square wave generator connected to the power control circuit for generating the driving signal according to the frequency modulation control signal, wherein a frequency of the driving signal is varied with the frequency modulation control signal, thereby suppressing the harmonics of the input current of the AC-DC converter and regulating a switching frequency of the switch circuit, and regulating the output power of the AC-DC converter.

10. The AC-DC converter according to claim 9 wherein the power control circuit includes a proportional subtractor circuit.

* * * * *